Feb. 6, 1934.   T. W. JOHNSON   1,946,402
CULTIVATOR
Original Filed Aug. 3, 1931    3 Sheets-Sheet 3
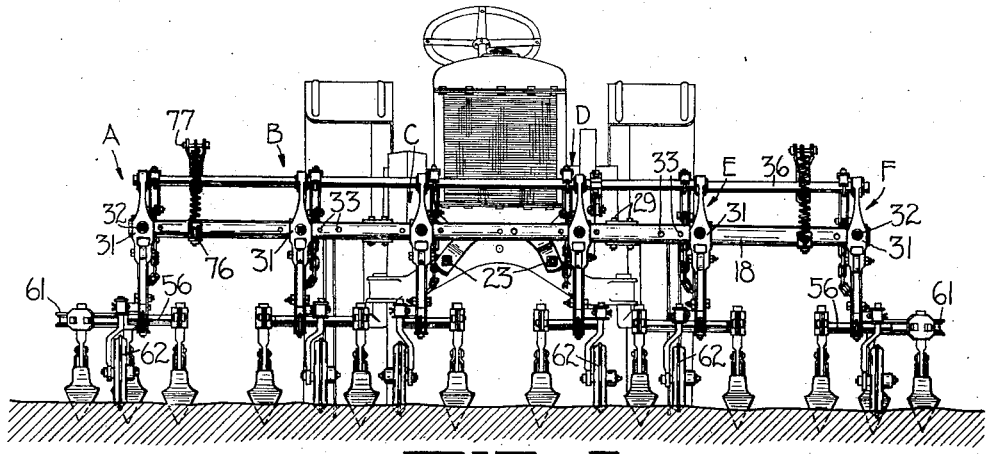
FIG-3
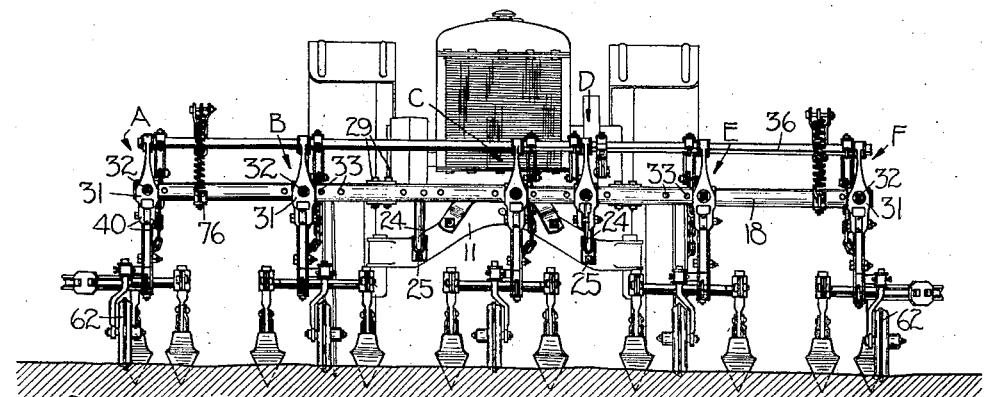
FIG-4
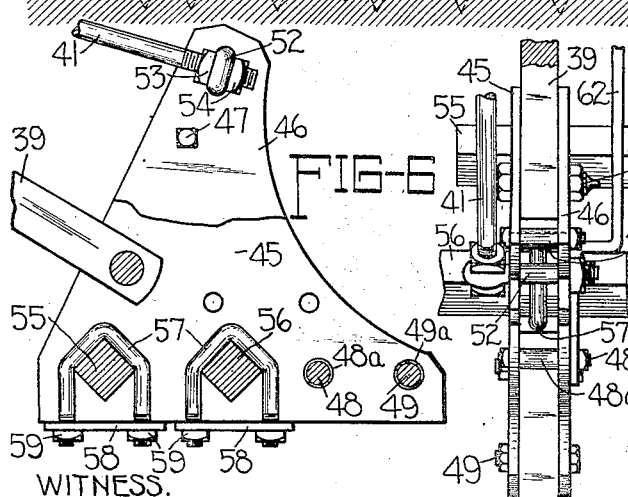
WITNESS.
Edward Melin.
INVENTOR.
Theodore W. Johnson
BY Brown, Jackson
Boettcher & Dienner
ATTORNEYS.

Patented Feb. 6, 1934

1,946,402

UNITED STATES PATENT OFFICE 1,946,402

CULTIVATOR

Theodore W. Johnson, Moline, Ill., assignor to Deere & Company, Moline, Ill., a corporation of Illinois Application August 3, 1931, Serial No. 554,748
Renewed December 13, 1932

35 Claims. (Cl. 97—47)

This invention relates generally to cultivating implements of the type comprising an attachment or attachments adapted to be directly connected with a tractor so that the attachment or attachments and the tractor function together as a unitary, power operating cultivating implement, and in which the cultivating rigs of such attachment or attachments are separately pivotally connected with the attachment frames so as to be capable of rising and falling independently of each other in passing over uneven ground, the pivotal connecting means being effective to maintain the shovel or shovels of the rig in a definite angular relation to the ground in the vertical movement of the rig relatively to the implement frame. As will hereinafter appear, however, certain features of the invention also have application to other types of cultivating implements.

As is well known, farmers usually space their corn rows farther apart than they do rows of various other crops, such as beans. Ordinarily, three rows of corn will occupy the same width in the field as four rows of beans, and it is therefore desirable to provide a cultivator attachment for a tractor which may be readily converted from a three-row corn cultivator to a four-row bean cultivator by shifting the rigs on the transverse draft member of the attachment frame, and to provide means for attaching the various earth working shovels to the rigs whereby certain of said shovels may be easily and quickly disconnected from one rig and attached to another rig so as to provide the proper number of earth working shovels on the several rigs between the various rows of crops. It is also desirable in machines of this type to dispense with the cultivator rigs which it has been customary to provide at the rear of the tractor for cultivating between certain of the rows. In the present implement these advantageous features have been made possible by supporting the transverse draft member sufficiently forward of the front wheels of the tractor and by specially designing the rig so that the shovels of the centrally located rigs are entirely in front of the front wheels of the tractor.

With the above mentioned desirable features in view my invention has for its principal object to provide an improved cultivator attachment for tractors whereby the implement may be easily and quickly converted from a three-row cultivator to a four-row cultivator.

Another object of my invention is to provide improved means for attaching the draft member of the implement frame directly on the axle of the front wheels of the tractor so that its position in a transverse vertical plane is determined by such front wheels, and whereby said draft member will be positioned sufficiently forward of such front wheels to permit the rigs to be shifted along said draft member to accommodate widely different row spacings without interference by the said wheels, with each rig being independently gauged by a castering gauge wheel.

Another object of my invention is to provide improved means for connecting the transversely extending tool shanks, carrying the earth working shovels, to the rig, which means are also adapted to have longitudinally extending rig beams connected therewith as desired.

A further object of the invention is to provide improved spring lifting means for each of the rigs whereby the tendency of the rigs to lift out of operating position is prevented, but which is operative to aid in lifting once the lifting operation is initiated.

Other objects and advantageous features will be apparent from the following description of the invention taken in connection with the accompanying drawings, in which:

Figure 3 is a front elevational view illustrating the cultivating rigs arranged on the draft member of the implement frame in position for cultivating three widely spaced crop rows, such as corn;

Figure 4 is a front elevational view illustrating the cultivating rigs arranged on the draft member for cultivating four narrow spaced crop rows, such as beans;

Figure 5 is a plan view looking down from the plane of the line 5—5 of Figure 1, illustrating the means for attaching the lower portion of each rig to the draft member; and Figure 6 is a side view of the parts shown in Figure 5, with the lower portion of the left hand plate of the attaching means broken away to better illustrate the various parts positioned between said plates.

Figure 1:
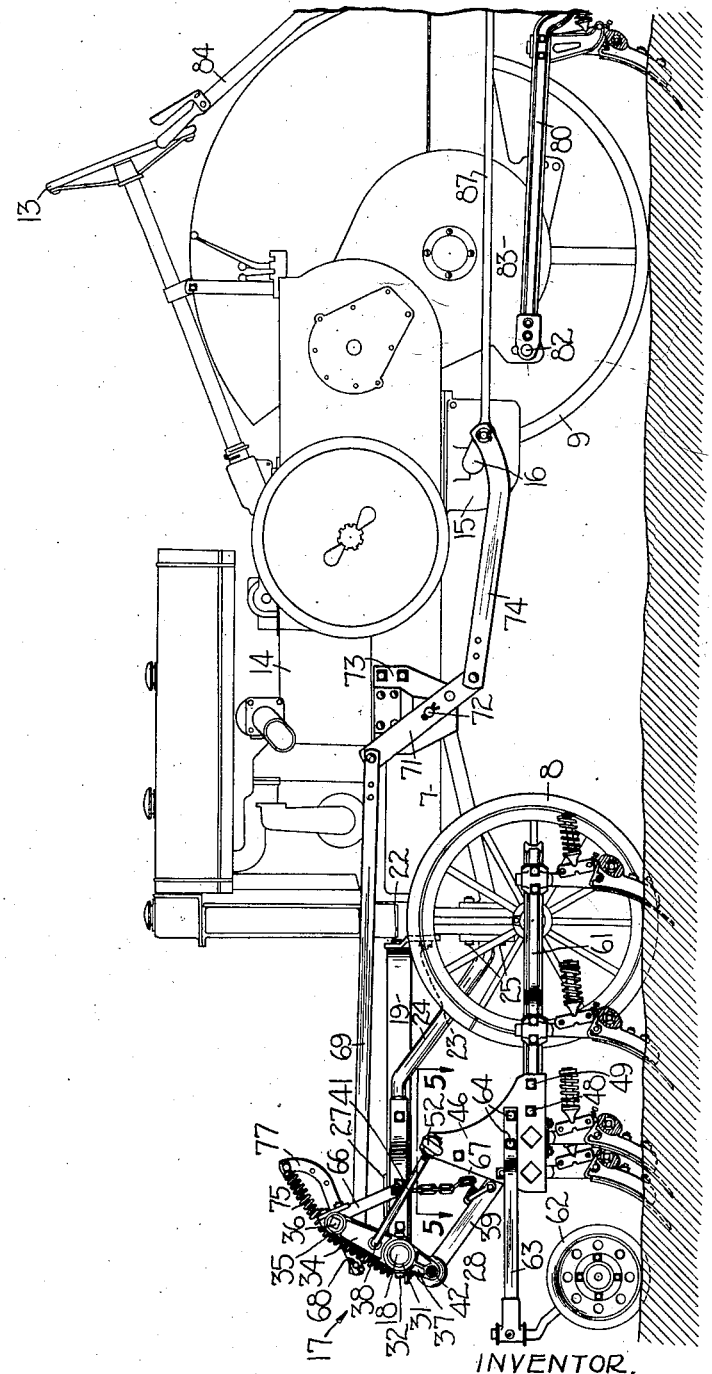
Figure 1 is a side elevational view illustrating a tractor and cultivat·unit embodying the principles of my invention.

Referring to the drawings, the tractor comprises a suitable main frame structure 7 which is supported at its front end on two steering wheels 8 and at its rear end on two traction wheels 9. The steering wheels 8 in the present construction are spaced relatively far apart, having approximately the same spacing as the rear traction wheels 9, and are mounted on opposite ends of an arched front axle 11, said wheels being steered by means of suitable steering mechanism represented in part by a drag link 12, which is operatively connected at its front end with said steering wheels and at its rear end with a steering control wheel 13 located at the rear of the tractor. The tractor motor is represented by a horizontal cylinder engine 14, from which power is transmitted through any conventional arrangement of clutch, selective speed transmission, differential mechanism and driving means to the rear traction wheels 9. In order to utilize the power of the engine for lifting the cultivator rigs to transport position the tractor is provided with a suitable power take-off device operatively connected with the engine and arranged to actuate a power lift clutch under the control of the operator.

Such power lift mechanism is indicated generally by the numeral 15, and it is believed unnecessary to describe the same specifically herein because the details thereof constitute no part of the present invention. It will suffice to say here that the power shaft extends laterally from such mechanism and supports a crank 16 adjacent to the side of the tractor frame from which lifting movement is transmitted to the cultivator rigs through linkage which will be presently described.

Figure 2:
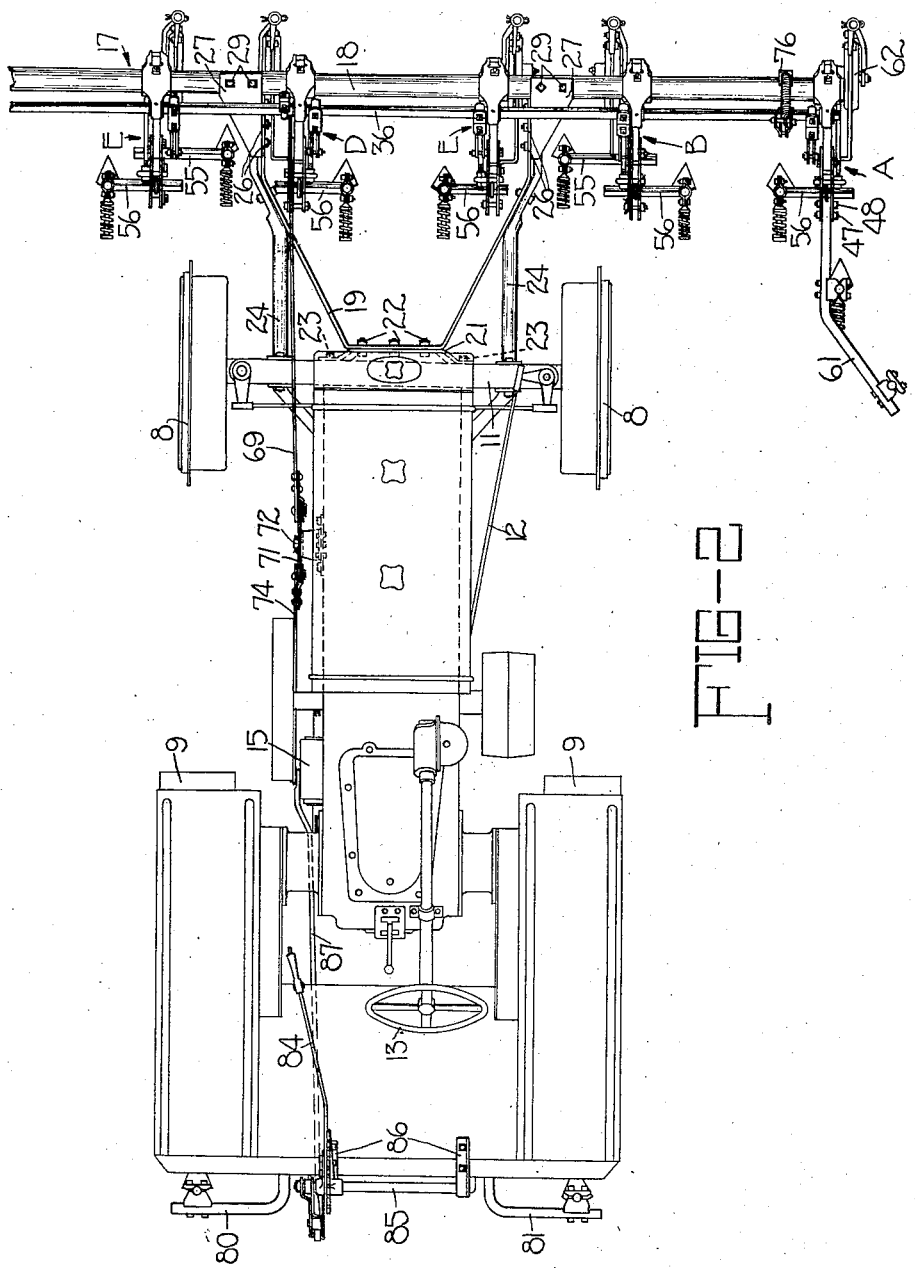
Figure 2 is a top plan view of the same.

The front implement frame is indicated in its entirety by the reference numeral 17, and comprises a rigid transversely extending draft member 18 connected to and supported by the arched front axle 11 of the tractor by means of a forwardly extending framework comprising a substantially V-shaped member 19 which is rigidly secured to a bracket 21 by means of bolts 22, which bracket is in turn secured to the front face of the axle 11 by means of bolts 23. The V-shaped member 19 is reenforced by means of suitable brace members 24 secured at their rear ends to the axle 11 on opposite ends of the arched portion thereof by bolts 25, as best shown in Figures 1 and 4. The forward ends of each of the arms of the member 19, together with the forward ends of their adjacent brace members 24 are secured by means of bolts 26 to the web that connects the upper and lower horizontally extending plates 27 and 28 together. The transversely extending draft member 18 is rigidly secured between said plates 27 and 28 by means of bolts 29 as best shown in Figure 2.

Supported on the draft bar 18 at spaced points across the width of the implement frame are a plurality of cultivating rigs indicated respectively by the reference characters A, B, C, D, E and F (see Figures 3 and 4). Each of said cultivating rigs is operatively connected with the draft member 18 by means of a suitable casting provided with a sleeve portion 31 engaging over said draft member and secured thereto by a bolt 32 extending transversely through the sleeve and draft member. The draft member is provided with a plurality of spaced holes 33, as best shown in Figures 3 and 4 for receiving the bolts 32 at different points therealong so that each sleeve 31 may be shifted in either direction along said bar for accommodating different row spacings between the pairs of rigs, this construction being similar to that shown in my pending application, Serial No. 485,844, filed October 2, 1930.

As best shown in Figure 1, an arm 34 projects upwardly and rearwardly from each sleeve 31 and has a bearing boss 35 formed at its outer end. A transversely extending rock shaft 36 is rotatably mounted in these several bearing bosses. Said sleeve 31 is also provided with a downwardly extending arm 37 positioned in alignment with the arm 34 as shown, which arm 37 is provided with a bifurcated bearing portion 40 at its lower end. The arm 34 is also provided with a second bearing portion 38 positioned intermediate the bearing portion 35 and the sleeve 31. These two bearing portions 40 and 38 of each sleeve member pivotally supports the forward ends of two spaced substantially parallel links 39 and 41 which support the lower portion of the cultivator rig. The upper link 41 has its forward end bent laterally to pass through the bearing 38, such bent end receiving a cotter pin or any other suitable retaining device on the opposite side of the bearing, as will be readily understood. The forward end of the lower link 39 is pivotally mounted between the bifurcated ends of the bearing portion 40 by a pivot bolt 42, and this end of the link is formed with a flattened portion of considerable area contacting with the flat surfaces of the bifurcated portions 40, whereby side play of the links 39 is substantially eliminated and the rig is accurately held in the desired plane or line of travel. This sleeve construction and the manner of connecting the forward end of the links 39 and 41 to the sleeve is similar to that shown and described in my application Serial No. 554,747, filed Aug. 3, 1931.

In the present construction I have provided improved means for supporting the various shovel beams of the rig on the rear ends of the links 39 and 41, such means comprising a pair of vertically extending parallel plates 45 and 46 secured together by means of bolts 47, 48, 49, having spacing sleeves 47a, 48a, 49a, mounted thereon respectively for holding said plates in suitable spaced relation to each other, as best shown in Figure 6. The rear end of the lower link 39 is journaled between said plates 45 and 46 on a pivot bolt 51, while the rear end of the upper link 41 extends through an eye-bolt 52, all as best shown in Figures 5 and 6. The link 41 is provided with screw threads adjacent its rear end whereby it is adjustably secured in the eye of the bolt 52 by means of nuts 53, 54, threaded on said end on opposite sides of said eye-bolt, as best shown in Figures 1 and 6.

Adjacent their lower edges said plates 45 and 46 are provided with square aligned perforations for receiving the square tool shanks 55, 56 that extend transversely of the implement, as best shown in Figures 2, 3 and 4. These several shanks are held rigidly in any transverse position of adjustment in said plates by means of U-bolts 57 positioned between the plates 45 and 46, as shown in Figures 5 and 6. The lower ends of said U-bolts pass through aligned holes in plates 58 extending across and bearing against the two lower edges of the plates 45 and 46, and nuts 59 are provided on the threaded ends of said U-bolts below said plates 58 whereby by tightening the nuts 59 on the ends of the U-bolts 57 the tool shanks 55 and 56 are rigidly secured in position in said plates.

As will be readily understood, when it is desired to adjust either or both of the shanks 55 and 56 to position the earth working shovels carried by said shanks closer to or farther from the plant rows, it is only necessary to loosen the nuts 59 to accomplish this movement, as will be readily understood.

As shown in Figure 2, the rigs B and E are each shown as being equipped with two transversely extending tool shanks 55 and 56, while the rigs A, C, D and F are shown as being equipped with but a single tool shank 56. The two outer rigs A and F, in addition to the tool shank 56, are each equipped with a rearwardly extending tool carrying beam 61 rigidly bolted between the plates 45 and 46 by means of the bolts 48 and 49. The spacing sleeves 48a and 49a mounted on the bolts 48 and 49 for holding the plates 45 and 46 suitably spaced apart as before mentioned are omitted between such plates when the rearwardly extending beams 61 are provided and secured between such plates by said bolts, as in that case said beams perform the same function as such spacing sleeves.

A castering gauge wheel 62 is provided on each rig for gauging the depth of penetration of the earth working shovels carried by said rings, said gauge wheel being carried by an arm 63 rigidly secured to the outer side of the plate 46 by means of bolts 64, as shown in Figure 1.

The shovel arrangement of the cultivator when three rows of corn or any other crop having a wide spacing of rows are to be cultivated is clearly illustrated in Figure 3. As there shown, the rig A is equipped with three shovels, the rig B with two shovels, one shovel being mounted on each transversely extending shank 55 and 56, and the rig C is equipped with only one shovel, the forward shank 55 being omitted from this rig. The rigs D, E and F are equipped with the same number of shovels as the rigs C, B and A respectively.

To convert this cultivator into one for cultivating four rows of beans or any other crop having a spacing of rows so that the tractor may straddle two rows, the shovel arrangement shown in Figure 4 is used. To change from one arrangement of shovels to the other, it is merely necessary to shift the rig C along the draft member 18 to a position near the center of the tractor, remove the rig mounting entirely from the casting which connects the rig D with the draft member, add shank 55 of rig D with its shovel to the rig C, and then remove the two rearmost shovels on the beams 61 of rigs A and F. This rearranging of the rigs and shovels as described is made assuming that the distance between four narrow spaced rows is equal to the distance between three wider spaced rows, which is the usual way in which farmers who have both bean and corn crops proportion their row spacings. If the rows are not so proportioned it may be necessary to shift some of the other rigs A, B, E and F in one direction or the other, but this may be readily done by reason of the additional holes 33 provided in the draft member 18 for receiving the bolts 32 which secure the castings of the several rigs to such draft member. It will thus be seen from the foregoing that the present implement may be readily converted from a three-row cultivator to a four-row cultivator with very little labor on the part of the operator.

The present invention also contemplates certain improvement in the lifting means for each rig. Secured to the rock shaft 36 in the plane of each rig mounting so as to rock therewith is a downwardly and rearwardly extending arm 66 having connected to its lower end one end of a chain 67, the opposite end of which is pivotally connected with the lower link 39 of the parallel link mechanism, as shown in Figure 1, whereby rocking of said rock shaft raises and lowers said rigs, as will be readily understood.

The rocking of the rock shaft 36 is controlled by the power lift mechanism 15 through means which will now be described. As shown in Figure 1, secured to said rock shaft and extending downwardly and forwardly therefrom is an arm 68, to the lower end of which is pivotally connected the forward end of a longitudinally extending bar or link 69, the rear end of which is pivotally connected to the upper end of a swinging arm 71 pivoted intermediate its ends on a pivot stud 72 mounted on a bracket 73 secured to the frame of the tractor. To the opposite end of said arm 71, as shown in Figure 1, is pivotally connected the forward end of a second link 74, which at its rear end is pivotally connected with the crank 16 of the power lift mechanism so as to be moved longitudinally by the operation of said crank, as will be readily understood.

To aid in the lifting operation a coiled spring 75 is provided. This spring, as shown in Figures 1 and 2, is connected between a bracket 76 fixed to the draft member 18 and an arm 77 fixed to the rock shaft 36. The position of the arm 77 on the rock shaft is so proportioned that when the rigs are in normal operating position the upper end of the arm 77 is rearwardly of the rock shaft 36 so that the spring is bent around the rock shaft, as shown in Figure 1, to bring the two ends of the spring in a substantially dead center relationship with respect to the center of the rock shaft 36 so that the spring will have little or no tendency to lift the rigs so long as they are in their normal working position, but upon turning of said rock shaft in a counter clockwise direction the arms 77 will move forwardly from such dead center relation so as to be available to aid in raising said rigs, as will be readily understood.

As shown in Figure 2, a pair of beams 80 and 81 are provided at each side of the tractor for supporting an earth working shovel directly in rear of each of the traction wheels for obliterating the tracks left by said wheels. The forward end of each of the beams 80 and 81 is pivotally connected on a pivot stud 82 suitably secured to the chain housing 83 which encloses the driving chain for the traction wheel on the respective side of the tractor, as shown in Figure 1. These two rear shovels are raised and lowered by the power lift mechanism and are also controlled by an independent hand lever 84 through the instrumentality of a rear rock shaft 85 mounted in brackets 86 secured to the rear portion of the tractor frame, as shown in Figure 2. The link which operatively connects the crank 16 of the power lift with the rear rock shaft 85 is indicated in Figures 1 and 2 by the reference numeral 87. The mounting of the beams 80 and 81 and the mechanism for raising and lowering said beams by operation of either the power lift mechanism or the hand lever 84 is similar to that shown in Figure 3 of my pending application, Serial No. 450,340, filed May 7, 1930, and these several parts are fully described and claimed in said application, and as they have nothing to do with my present invention it is not deemed necessary to describe them more in detail herein.

It is to be noted that by virtue of the swinging arm 71 which acts as a motion reversing lever, the forward link 69 which is connected with the front rock shaft 36 acts in tension during the rig raising operation just as does the rear link 87 which is connected with the rear rock shaft 85.

I claim:—

1. An agricultural implement comprising the combination with a tractor including a front axle, of an attachment comprising a draft member rigidly connected with said front axle, a plurality of cultivator rigs mounted to swing vertically relatively to said draft member, means adjustably connecting said cultivator rigs with said draft member whereby said rigs may be adjusted laterally along said draft member to vary the spacing between the rigs, and a castering gauge wheel for each of said rigs.

2. An agricultural implement comprising the combination with a tractor including a front axle and steering wheels mounted thereon, of an attachment comprising a draft member extending transversely of the tractor in advance thereof, means connecting said draft member with said front axle, a plurality of cultivator rigs connected with said draft member in advance of said steering wheels to swing vertically about a transverse axis, connecting means for adjustably securing said rigs to the draft member in any one of a number of laterally adjusted positions, and a castering gauge wheel mounted on each of said rigs.

3. An agricultural implement comprising the combination with a tractor including a motor and a front axle with steering wheels mounted thereon, of an attachment comprising a draft member extending transversely of the tractor in advance thereof, means connecting said draft member with said front axle, a plurality of cultivator rigs connected with said draft member in advance of said steering wheels to swing about a transverse axis, means for adjustably connecting said rigs to the draft member in any one of a number of laterally adjusted positions, a castering gauge wheel mounted on each of said rigs, and power lift mechanism deriving power from the tractor motor for raising and lowering said rigs.

4. An agricultural implement comprising the combination with a tractor including a motor and a front axle with steering wheels mounted thereon, of an attachment comprising a draft member extending transversely of the tractor in advance thereof, means connecting said draft member with said front axle, a plurality of cultivator rigs connected with said draft member in advance of said steering wheels to swing about a transverse axis, means for adjustably connecting said rigs to the draft member in any one of a number of laterally adjusted positions, a castering gauge wheel mounted on each of said rigs, a rock shaft supported by said draft member and operative to raise and lower said rigs, and power lift mechanism deriving power from the tractor motor operatively connected with said rock shaft for rocking the same.

5. An agricultural implement comprising the combination with a tractor including a front axle and steering wheels mounted thereon, a transverse draft member, connecting means secured to the front axle and to said member rigidly securing it to said axle whereby its position in a transverse vertical plane is determined by the steering wheels of the tractor, brace means also secured to said axle and reinforcing said connecting means, a plurality of cultivator rigs mounted on said draft member to swing vertically relatively thereto, and means connecting said rigs with said draft member whereby said rigs may be shifted laterally along said member to vary the spacing between the rigs, said draft member being positioned in advance of the steering wheels whereby said rigs will clear said steering wheels in the lateral shifting movement of said rigs.

6. An agricultural implement comprising the combination with a tractor including a front axle, of an attachment comprising a draft member rigidly secured to said axle, cultivator rigs carried by said draft member, parallel link mechanism connecting said rigs with said draft member, each of said rigs including a pair of vertically extending plates, means connecting said plates together in spaced relation to each other, transversely extending tool carrying shanks, and means for securing said shanks to said plates, said first mentioned means providing means for securing a longitudinally extending rig beam to said plates.

7. A cultivator rig comprising a pair of vertically extending spaced plates, transversely extending tool carrying shanks carried by said plates, and a longitudinally extending tool carrying beam having its forward end secured between said plates.

8. A cultivator rig comprising a pair of vertically extending spaced plates having aligned openings therein, a transversely extending tool carrying shank extending through said aligned openings, and means for adjustably securing said shank in position in said plates.

9. A cultivator rig comprising a pair of vertically extending spaced plates having aligned openings therein, a transversely extending tool carrying shank extending through said aligned openings, and means for holding said shank rigidly in position in said plate, said means comprising a U-bolt positioned between said plates and embracing said shank, a third plate extending laterally across and bearing against the lower edges of said spaced plates, the ends of said U-bolt extending through aligned openings in said third plate, and nuts secured to the ends of said U-bolt.

10. A cultivator rig comprising a pair of vertically extending spaced plates having aligned openings therein, a transversely extending tool carrying shank extending through said aligned openings, and clamping means between said plates for adjustably securing said shank in position in said plates.

11. An agricultural implement comprising the combination with a tractor including a motor and a front axle, of an attachment comprising a draft member rigidly connected with and extending entirely forward of said front axle, a plurality of cultivator rigs mounted to swing vertically relatively to said draft member, means adjustably connecting said cultivator rigs with said draft member whereby said rigs may be adjusted laterally along said draft member to vary the spacing between the rigs, a castering gauge wheel for each of said rigs, a rock shaft supported by said draft member, means connecting said rock shaft with each of said rigs, and power lift means deriving power from the tractor motor and operatively connected with said rock shaft for rocking the same to raise and lower said rigs.

12. An agricultural implement comprising the combination with a tractor including a front axle, of an attachment comprising a draft member rigidly connected with said front axle, a plurality of cultivator rigs mounted to swing vertically relatively to said draft member, means adjustably connecting said cultivator rigs with said draft member whereby said rigs may be adjusted laterally along said draft member to vary the spacing between the rigs, said rigs including transversely extending tool carrying shanks, and means adjustably connecting said shanks with said rigs whereby the earth working tools carried by said shanks may be adjusted toward and from the plant rows.

13. An agricultural implement comprising the combination with a tractor including a front axle, of an attachment comprising a draft member rigidly connected with said front axle, a plurality of cultivator rigs mounted to swing vertically relatively to said draft member, means adjustably connecting said cultivator rigs with said draft member whereby said rigs may be adjusted laterally along said draft member to vary the spacing between the rigs, a rock shaft supported by said draft member, means connecting each of said rigs with said rock shaft, each of said rigs including a transversely extending tool carrying shank, and means adjustably connecting said shank with said rig whereby the earth working tools carried by said shanks may be adjusted toward and from the plant rows, and means for rocking said rock shaft for raising and lowering said rigs.

14. An agricultural implement comprising the combination with a tractor including a front axle, of an attachment comprising a draft member rigidly connected with said front axle, a plurality of cultivator rigs mounted to swing vertically relatively to said draft member, means adjustably connecting said rigs with said draft member whereby said rigs may be adjusted laterally along said draft member to vary the spacing between the rigs, each of said rigs including a pair of vertically extending spaced plates provided with aligned openings therein, a transversely extending tool carrying shank extending through said openings, and means for adjustably securing said shank in said plates whereby the earth working tools carried by said shanks may be adjusted toward and from the plant rows.

15. An agricultural implement comprising the combination with a tractor including a front axle, of an attachment comprising a draft member rigidly connected with said front axle, a plurality of cultivator rigs, parallel links connecting each of said rigs with said draft member, each of said rigs comprising a pair of vertically extending spaced plates provided with aligned openings extending transversely therethrough, a transversely extending tool carrying shank extending through said aligned openings, means for adjustably connecting said shank with said plates whereby said shank may be adjusted laterally thereof, bearing means between said plates for one of said parallel links, and means pivotally connecting the other of said parallel links with one of said plates.

16. In an agricultural implement, the combination of cultivator rigs, a draft member, means connecting the rigs to said draft member, means including a rock shaft supported by said draft member for raising and lowering said rigs, and a lifting spring connected with said rock shaft to aid in raising said rigs, said spring being in a substantially dead center relation with respect to the rock shaft when said rigs are in operating position, whereby said spring will exert no tendency to raise the rigs as long as they are in operating position.

17. In an agricultural implement, the combination of cultivator rigs, a draft member, means connecting the rigs to said draft member, a rock shaft supported by said draft member, means connecting said rigs with said rock shaft, a spring connected at one end with said draft member and at its opposite end with an arm secured to said rock shaft, said spring bending over said rock shaft when said rigs are in operating position, whereby the ends of said spring will be positioned in a substantially dead center relation with respect to the center of said rock shaft to hold said rigs in operating position, and means operatively connected with said rock shaft for rocking it to raise and lower said rigs.

18. In an agricultural implement, the combination with a tractor including a motor, of cultivator rigs, a draft member rigidly connected to the tractor, means connecting the rigs to said draft member, a rock shaft supported by said draft member, means connecting said rigs with said rock shaft, a spring connected at one end with said draft member and at its opposite end with an arm secured to said rock shaft, said spring bending over said rock shaft when said rigs are in operating position, whereby the ends of said spring will be positioned in a substantially dead center relation with respect to the center of said rock shaft to hold said rigs in operating position, and power lift means connected with said rock shaft and deriving power from the tractor motor for rocking said rock shaft to raise and lower said rigs, said spring operating to aid in the lifting operation when moved from such dead center relation upon turning of the rock shaft by said power lift mechanism in the lifting operation.

19. An agricultural implement comprising the combination with a tractor including a motor and a front axle, of an attachment comprising a draft member rigidly secured to said axle, cultivator rigs carried by said draft member, parallel link mechanism connecting said rigs with said draft member, each of said rigs including a pair of vertically extending plates, means connecting said plates together in spaced relation to each other, means connecting said parallel link mechanism with said plates, a tool carrying shank adjustably mounted in said plates for lateral movement relative thereto, a rock shaft supported by said draft member, means connecting said rock shaft with said rigs, a coiled spring connected at one end with said draft member and at its opposite end with an arm secured to and extending from said rock shaft, said spring bending over said rock shaft when said rigs are in operating position, whereby the ends of said spring will be positioned in a substantially dead center relation with respect to the center of said rock shaft to hold said rigs in operating position, and power lift means connected with said rock shaft and deriving power from the tractor motor for rocking said rock shaft to raise and lower said rigs.

20. An agricultural implement comprising a wheeled frame, a transverse draft member connected therewith, a plurality of cultivator rigs connected with said draft member, means adjustably securing each of the rigs to said member in any one of a plurality of adjusted positions, certain of said rigs including at least one removable tool, whereby the tools may be rearranged and the rigs readjusted along the draft member to change the implement from one arranged to operate on a given number of rows to one arranged to operate on a different number of rows, and means for raising and lowering the rigs.

21. In an agricultural implement, the combination with a tractor, of a transverse draft member connected with the front portion of the tractor, a plurality of cultivating rigs connected with said draft member to swing toward and from the ground, each of said rigs including a pair of vertically extending plates and a longitudinally extending rig beam, means connecting said plates together in spaced relation to each other, transversely extending tool carrying shanks, and means for securing said shanks to said plates, said first mentioned means providing means for securing said longitudinally extending rig beam to said plates.

22. In an agricultural implement, the combination with a tractor, of a draft member connected with the front portion of the tractor and extending laterally on opposite sides thereof, a plurality of cultivating rigs carried by said draft member on opposite sides of the tractor to swing toward and from the ground, parallel link mechanism connecting said rigs with said draft member, each of said rigs including a pair of vertically extending plates and a longitudinally extending rig beam, means connecting said plates together in spaced relation to each other, transversely extending tool carrying shanks, and means for securing said shanks to said plates, said first mentioned means providing means for securing said longitudinally extending rig beam to said plates.

23. In an agricultural implement, the combination with a tractor, of a draft member connected with the front portion of the tractor and extending laterally on opposite sides thereof, a plurality of cultivating rigs carried by said draft member on opposite sides of the tractor to swing toward and from the ground, means supporting each of said rigs from said draft member, said means comprising a pair of vertically spaced links pivotally connected with the draft member and with the rig, each of said rigs including a pair of vertically extending plates and a longitudinally extending rig beam, means connecting said plates together in spaced relation to each other, transversely extending tool carrying shanks, and means for securing said shanks to said plates, said connecting means providing means for securing said longitudinally extending rig beam to said plates.

24. The combination with a tractor, of a tillage implement disposed in front of the tractor comprising a transversely extending implement frame, cultivator rigs carried by said implement frame, link mechanism connecting said rigs with said implement frame, each of said rigs including a pair of vertically extending plates and a longitudinally extending rig beam, means connecting said plates together in spaced relation to each other, transversely extending tool carrying shanks, and means for securing said shanks to said plates, said first named means providing means for securing said longitudinally extending rig beam to said plates.

25. An agricultural implement comprising the combination with a tractor including a motor and a front axle, of an attachment comprising a draft member rigidly connected with and disposed entirely forward of said front axle, a plurality of cultivator rigs mounted to swing vertically relatively to said draft member, means adjustably connecting said cultivator rigs with said draft member whereby said rigs may be adjusted laterally along said draft member to vary the spacing between the rigs, a castering gauge wheel for each of said rigs, a rock shaft supported by said draft member, means connecting said rock shaft with each of said rigs, and power lift means including a motion reversing lever deriving power from the tractor motor and operatively connected with said rock shaft for rocking the same to raise and lower said rigs.

26. An agricultural implement comprising the combination with a tractor including a motor, of an attachment comprising a draft member connected with said tractor, a plurality of cultivator rigs mounted to swing vertically relatively to said draft member, means adjustably connecting said cultivator rigs with said draft member whereby said rigs may be adjusted laterally along said draft member to vary the spacing between the rigs, a castering gauge wheel for each of said rigs, a rock shaft supported by said draft member, means connecting said rock shaft with each of said rigs, and power lift means including a motion reversing lever deriving power from the tractor motor and operatively connected with said rock shaft for rocking the same to raise and lower said rigs.

27. An agricultural implement comprising the combination with a tractor including a motor, of an attachment comprising a draft member rigidly connected with the forward end of said tractor, a plurality of cultivator rigs mounted to swing vertically relatively to said draft member, a castering gauge wheel for each of said rigs, a rock shaft supported by said draft member, means connecting said rock shaft with each of said rigs, and power lift means including a motion reversing lever mounted on the tractor and deriving power from the tractor motor and operatively connected with said rock shaft for rocking the same to raise and lower said rigs.

28. An agricultural implement comprising the combination with a tractor including a front axle, of an attachment comprising a draft member rigidly connected with said front axle, a plurality of cultivator rigs mounted to swing vertically relatively to said draft member, means adjustably connecting said cultivator rigs with said draft member whereby said rigs may be adjusted laterally along said draft member to vary the spacing between the rigs, and a castering gauge wheel for each of certain of said rigs.

29. An agricultural implement comprising the combination with a tractor including a front axle, of an attachment comprising a draft member rigidly connected with said front axle, a plurality of cultivator rigs mounted to swing vertically relatively to said draft member, and a castering gauge wheel for each of certain of said rigs.

30. An agricultural implement comprising the combination with a tractor including a front axle and steering wheels mounted thereon, of an attachment comprising a draft member extending transversely of the tractor in advance thereof, means connecting said draft member with said front axle, a plurality of cultivator rigs connected with said draft member in advance of said steering wheels to swing vertically about a transverse axis, connecting means for adjustably securing said rigs to the draft member in any one of a number of laterally adjusted positions, and a castering gauge wheel mounted on each of certain of said rigs.

31. An agricultural implement comprising the combination with a tractor including a motor, of an attachment comprising a draft member connected with said tractor, a plurality of cultivator rigs mounted to swing vertically relatively to said draft member, means adjustably connecting said cultivator rigs with said draft member whereby said rigs may be adjusted laterally along said draft member to vary the spacing between the rigs, a castering gauge wheel for certain of said rigs, a rock shaft supported by said draft member, means connecting said rock shaft with each of said rigs, and power lift means deriving power from the tractor motor and operatively connected with said rock shaft for rocking the same to raise and lower said rigs.

32. An agricultural implement comprising the combination with a tractor, of an attachment comprising a draft member rigidly connected with said tractor, a plurality of cultivator rigs mounted to swing vertically relatively to said draft member, means adjustably connecting said cultivator rigs with said draft member whereby said rigs may be adjusted laterally along said draft member to vary the spacing between the rigs, and a castering gauge wheel for each of said rigs positioned forwardly of the draft member of said attachment.

33. An agricultural implement comprising the combination with a tractor including a front axle and steering wheels mounted thereon, of an attachment comprising a draft member extending transversely of the tractor adjacent the front axle thereof, means connecting said draft member with said tractor, a plurality of cultivator rigs connected with said draft member to swing vertically about a transverse axis, connecting means for adjustably securing said rigs to the draft member in any one of a number of laterally adjusted positions, and a castering gauge wheel mounted on each of the laterally outer rigs and positioned forwardly of the draft member of said attachment.

34. An agricultural implement comprising the combination with a tractor including a motor and a front axle, of an attachment comprising a draft member rigidly connected with and disposed forward of said front axle, a plurality of cultivator rigs mounted to swing vertically relatively to said draft member, means adjustably connecting said cultivator rigs with said draft member whereby said rigs may be adjusted laterally along said draft member to vary the spacing between the rigs, castering gauge wheels for the laterally outer rigs and positioned forwardly of the draft member of said attachment, a rock shaft supported by said draft member, means connecting said rock shaft with each of said rigs, and power lift means deriving power from the tractor motor and operatively connected with said rock shaft for rocking the same to raise and lower said rigs.

35. An agricultural implement comprising a wheel supported draft frame, a plurality of cultivator rigs, means connecting the rigs to the draft frame for vertical movement, means including a rock shaft supported by the draft frame for raising and lowering said rigs, an arm on the rock shaft, and a lifting spring connected between the end of said arm and said draft frame to aid in raising said rigs, said arm being positioned on said rock shaft so that said spring is disposed in substantially a dead center relation with respect to said rock shaft when said rigs are in operating position, whereby said spring will exert no tendency to raise the rigs as long as they are in operating position.

THEODORE W. JOHNSON.